United States Patent [19]

Hetzel et al.

[11] 4,301,326

[45] Nov. 17, 1981

[54] CONTROLLABLE CURSOR VACUUM HOLD DOWN

[75] Inventors: Henry T. Hetzel; Michael A. Tremblay, both of Loveland, Colo.

[73] Assignee: Hewlett-Packard Company, Palo Alto, Calif.

[21] Appl. No.: 167,608

[22] Filed: Jul. 11, 1980

Related U.S. Application Data

[63] Continuation of Ser. No. 964,013, Nov. 27, 1978, abandoned.

[51] Int. Cl.³ ...................... G08C 21/00; A45D 42/14
[52] U.S. Cl. ........................................ 178/18; 248/362
[58] Field of Search ............. 178/18, 19, 20; 33/1 M; 248/362; 340/146.3 SY; 128/643; 346/139 C

[56] References Cited

U.S. PATENT DOCUMENTS

| | | | |
|---|---|---|---|
| 3,568,663 | 3/1971 | Phipps | 128/643 |
| 3,876,831 | 4/1975 | Wickham et al. | 178/19 |

*Primary Examiner*—Thomas A. Robinson
*Attorney, Agent, or Firm*—Edward L. Miller

[57] ABSTRACT

A cursor for a digitizer is selectively made to adhere to the digitizing surface by the controlled application of a vacuum to the underside of the cursor. The control can reside either in a manually activated switch on the cursor, or in commands issued to the digitizer by its controlling device.

25 Claims, 11 Drawing Figures

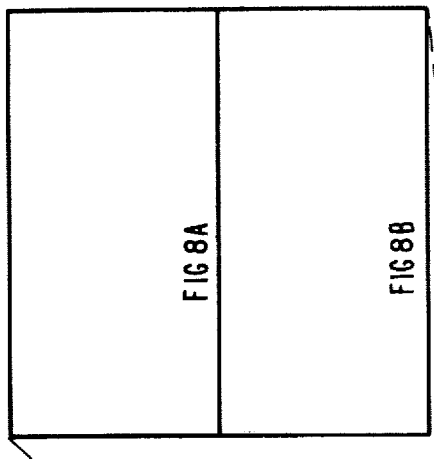
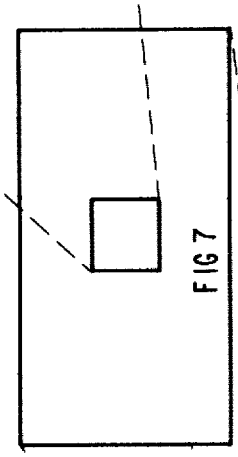
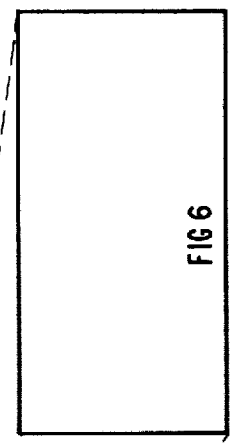
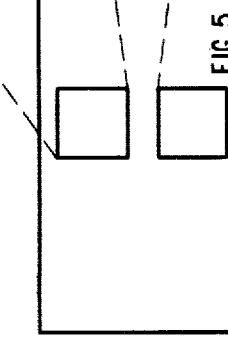
HOW SOME OF THE FIGURES ARE RELATED
FIG 4

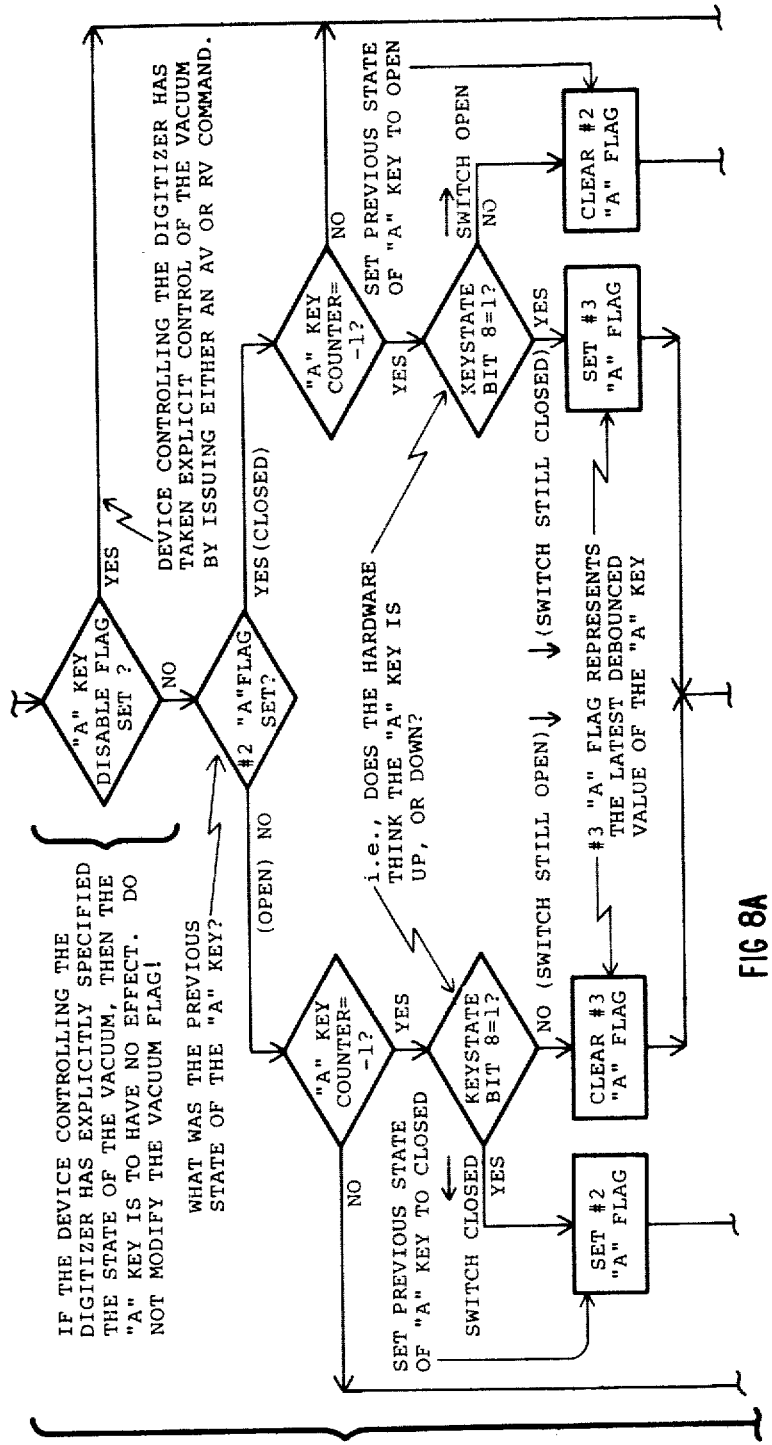

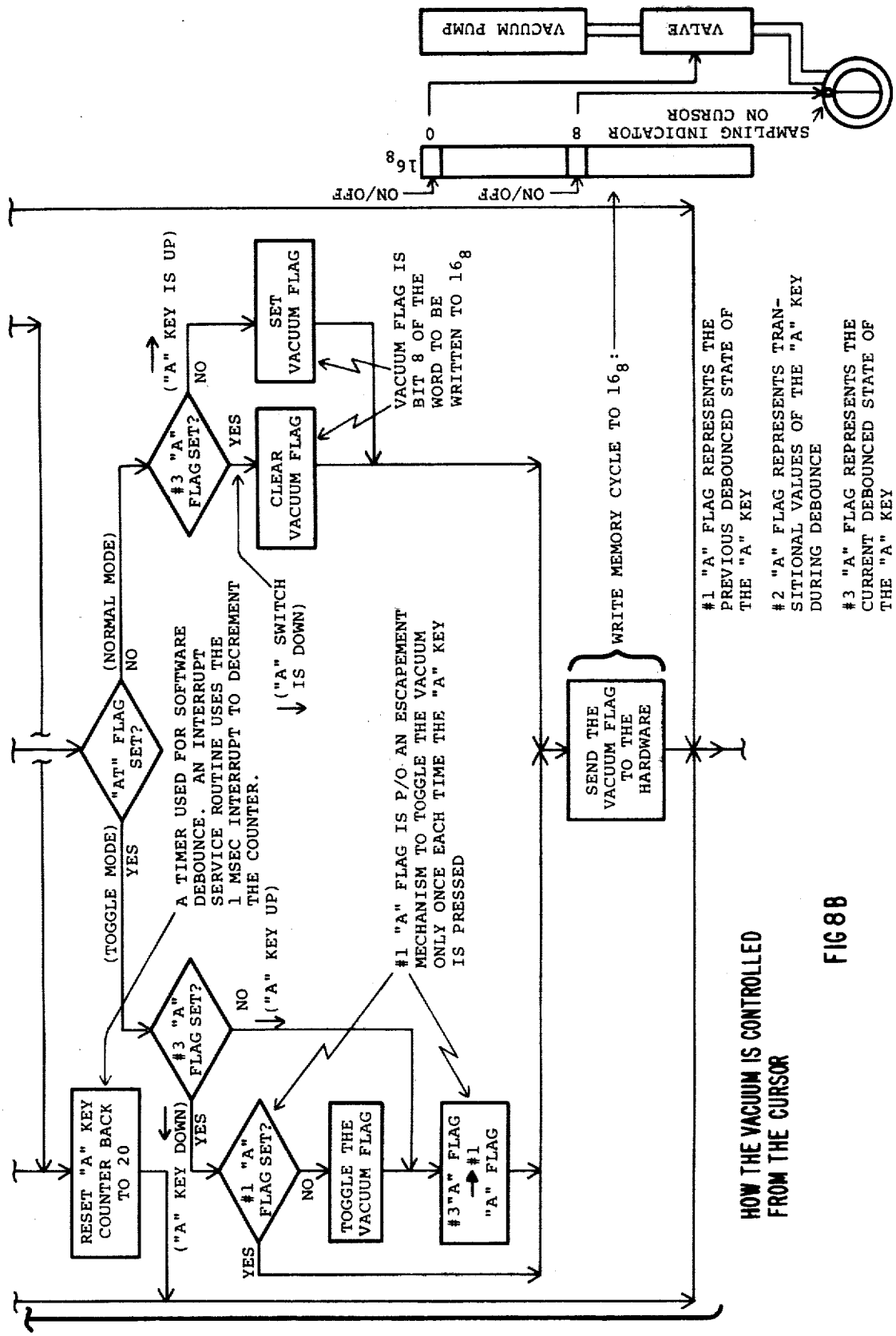

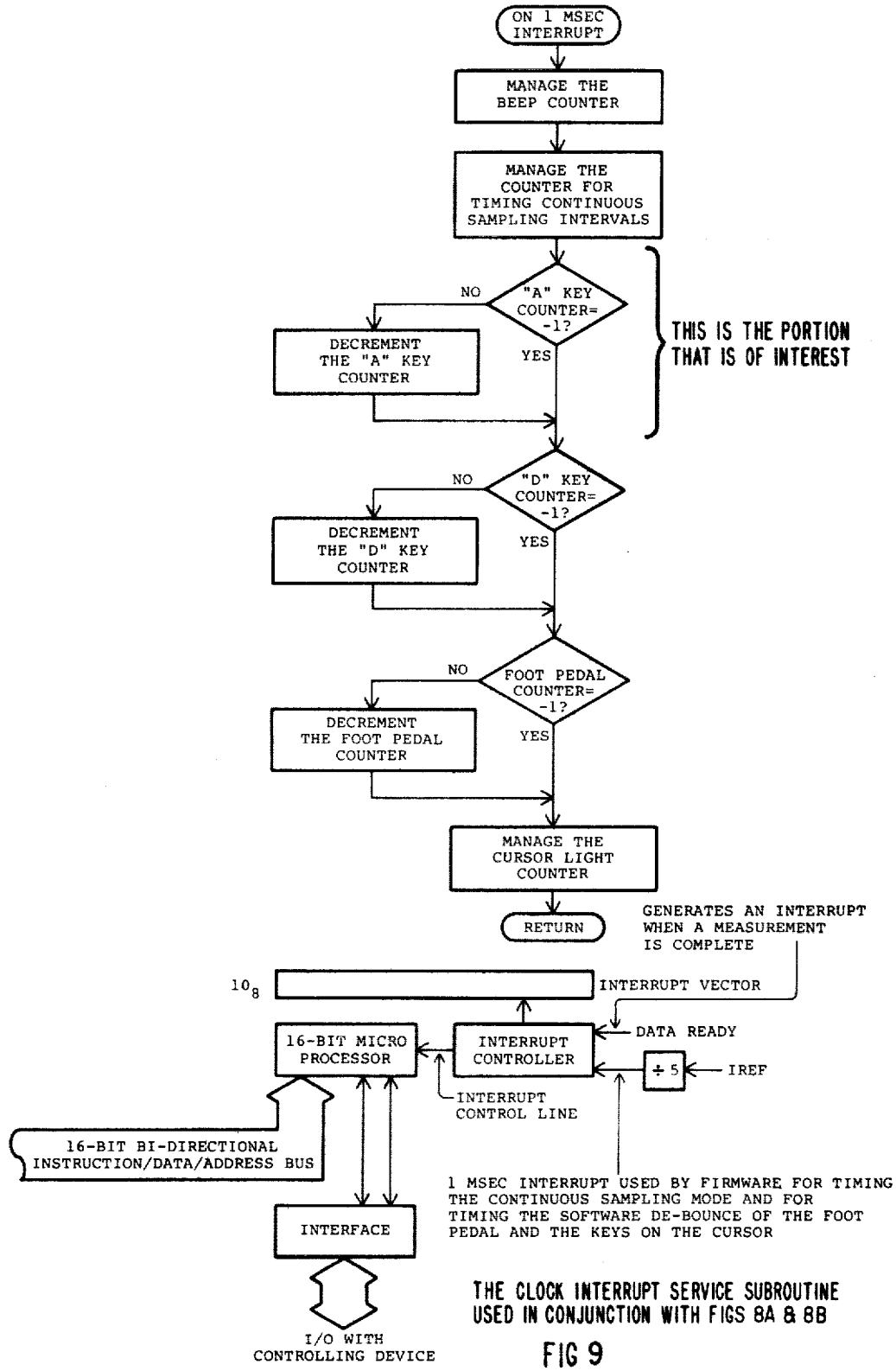

CONTROLLABLE CURSOR VACUUM HOLD DOWN

REFERENCES TO RELATED APPLICATIONS

This application is a continuation of an earlier filed copending application of the same title, Ser. No. 964,013, filed on Nov. 27, 1978, by Henry T. Hetzel and Michael A. Tremblay, and which is now abandoned.

This application is related to a portion of the subject matter of copending U.S. patent application Ser. No. 69,956 entitled TRAVELLING WAVE DIGITIZER, filed on Aug. 27, 1979, by Frank Paul Carau, Sr., Henry T. Hetzel, and Michael A. Tremblay and assigned to the same assignee as the present application. U.S. patent application Ser. No. 69,956 is in turn a continuation of U.S. patent application Ser. No. 944,931 filed Sept. 22, 1978. Application Ser. No. 944,931 is now abandoned.

The present application is also related to a portion of the subject matter of U.S. patent application Ser. No. 952,230 entitled APERTURE CAPACITOR PICKUP, filed on Oct. 17, 1978, by Henry T. Hetzel, now U.S. Pat. No. 4,194,084, issued Mar. 18, 1980 and assigned to the same assignee as the present application.

BACKGROUND AND SUMMARY OF THE INVENTION

The majority of prior art digitizers have not required cursor hold down means (i.e., a way to cause the cursor to adhere to the digitizing surface, or platen) because most such digitizers have been employed with their platens in a horizontal position. There have been instances where large platens have been mounted on tilting stands, in a manner resembling drafting tables. Some of these systems have incorporated free moving hand held cursors (that is, cursors not constrained by a mechanical linkage), and in those systems it has been necessary to provide some sort of restraining device to hold the cursor when it is not in use and the platen is tilted at a steep angle.

The present invention is associated with a digitizer having a transparent platen of modest size that tilts vertically to allow rear projection. However, the invention is applicable to any digitizer incorporating a cursor (as opposed to a stylus) whose platen can, for whatever reason, be tilted sufficiently that the cursor slides of its own accord. The invention comprises a controllable vacuum hold down for the cursor. The control can be exercised in different modes, and has many advantages over schemes involving restraining devices.

Briefly, the invention is as follows. A source of vacuum is provided. The vacuum source is responsive to a control means such that the vacuum can either be present at the cursor, or absent. The cursor is connected to the vacuum source by a flexible hose. A circular vacuum port on the underside of the cursor causes the cursor to adhere to any flat surface it is placed against, provided the vacuum is present.

In the embodiment under consideration the vacuum is high enough, in conjunction with the amount of surface area to which it is applied, that the cursor is nearly immovable when the vacuum is present. Since the cursor is relatively light in weight, this ensures that the vacuum can support an unattended cursor; even on a platen that is vertical, or even upside down (i.e., the cursor is "overhead"). In addition, the volume of space to be evacuated by the vacuum is small, so that cursor adherence appears to the operator to be instantaneous once the vacuum is applied.

The device controlling the digitizer (i.e., the device to which the digitizer supplies data) determines, by issuing commands, the mode in which the controls affecting the vacuum will operate. To begin with, the controller (the above mentioned controlling device) may specify that the vacuum be applied until the controller specifies otherwise. Or, the controller may specify that the vacuum be absent until the controller specifies otherwise. In each of these cases the operator of the digitizer cannot affect the vacuum by pressing an "A" switch (air, or vacuum, push button) located on the cursor itself.

However, the controller can issue commands that allow the "A" switch to affect the vacuum, and that indicate how the presence or absence of the vacuum is to be related to pressing the "A" switch. In one mode, called the Toggle Mode, the vacuum alternates between presence or absence, changing each time the "A" switch is pressed. In another mode, called the Normal Mode, the vacuum is continuously present except for periods of time when the "A" switch is pressed. During those intervals the vacuum will be absent.

When a digitizer having the above mentioned attributes is used in conjunction with a controller such as a programmable calculator, desktop computer, or other computer, a number of advantageous operational features may be obtained. These include:

The operator can apply cursor vacuum to cause the cursor to remain in its present location even though the cursor is unattended and the platen is tilted at a steep angle or is vertical.

The prevention of damage to the cursor if it is accidently "dropped" while the operator is digitizing in the "Normal Mode" (of vacuum control); by dropping the cursor he releases the "A" switch, which applies the vacuum so that the cursor does not fall.

The controller may be programmed to apply cursor vacuum to prevent the operator from sliding the cursor outside of a window or beyond limits established by the controller.

The controller may be programmed to apply cursor vacuum to prevent the operator from moving the cursor at a velocity higher than will allow points to be digitized with a minimum density established by the controller.

The controller may be programmed to apply cursor vacuum to enforce an interruption in the digitizing process to allow time for some internal processing to occur or until some asynchronous external event or condition occurs.

The controller may be programmed to provide the operator with tactile feedback relating to cursor position by very briefly applying cursor vacuum as the cursor is moved across imaginary grid lines established by the controller.

The controller may be programmed to lock the cursor onto a point being homed onto by the operator, once the cursor reaches that point, by applying cursor vacuum.

BRIEF DESCRIPTION OF THE DRAWINGS

FIG. 4 is a diagram illustrating the relationship between FIGS. 5, 6, 7, 8A and 8B.

FIGS. 8A and 8B are expansions of a portion of FIG. 7, and comprise a detailed flowchart illustrating the control of the vacuum hold down from a key on the cursor of FIGS. 1 and 2B.

FIG. 9 is a flowchart illustrating an interrupt service subroutine used in conjunction with the flowchart of FIGS. 8A and 8B.

DESCRIPTION OF THE PREFERRED EMBODIMENT

Figure 1:
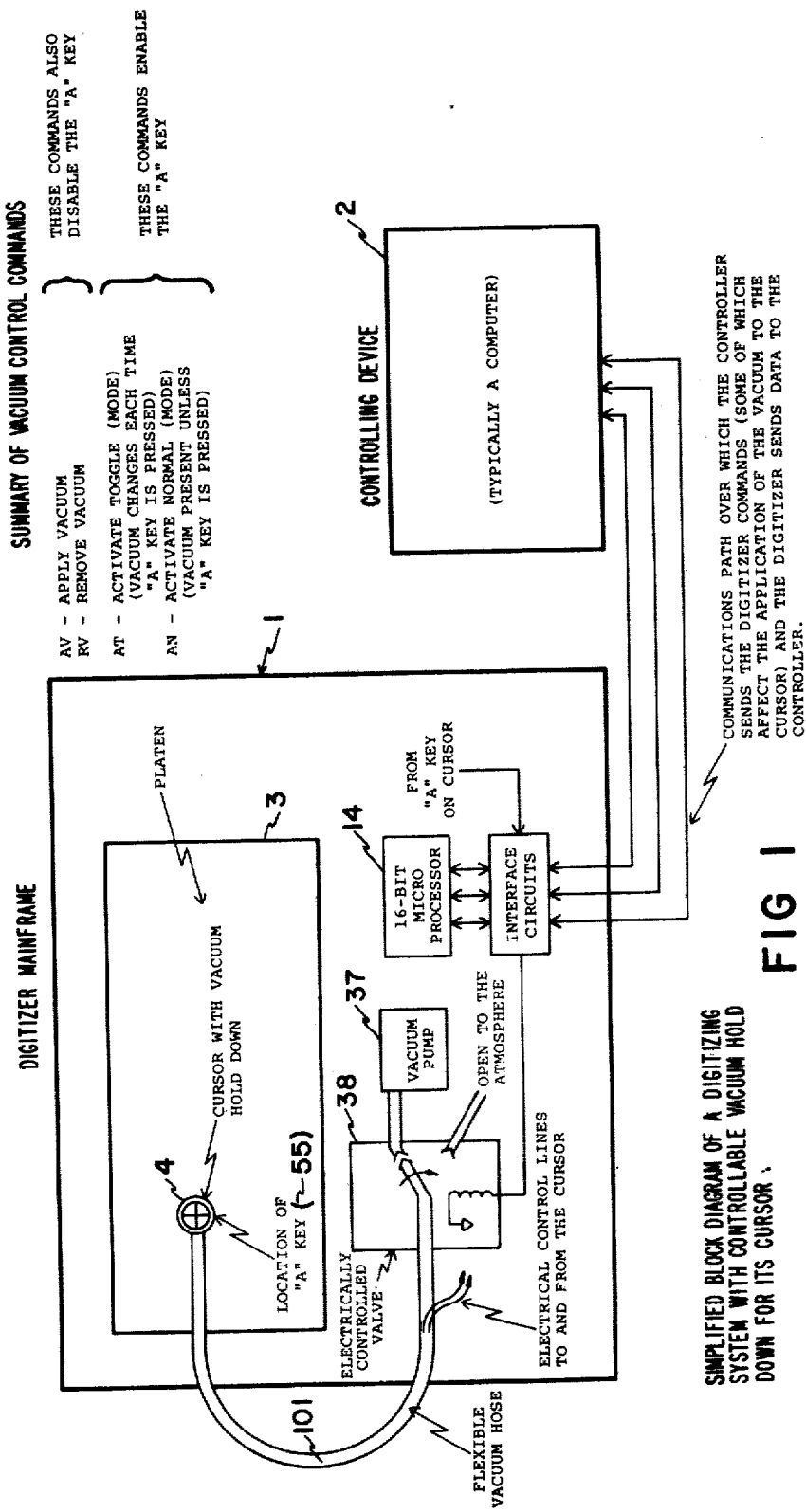
FIG. 1 is a block diagram illustrating a digitizing system comprising a digitizer and its controlling device, and including a cursor with controllable vacuum hold down.

The present disclosure is best understood with reference to the earlier mentioned applications "Aperture Capacitor Pickup" Ser. No. 952,230 and "Travelling Wave Digitizer", Ser. No. 69,956, each of which is hereby incorporated by reference. FIG. 1 and a combination of portions of FIGS. 4 and 5 of "Aperture Capacitor Pickup" correspond respectively to FIGS. 2B and 3 of the present disclosure. Likewise, FIG. 1 and a portion of FIG. 16B of "Travelling Wave Digitizer" correspond respectively to FIGS. 2A and 5 of the present disclosure. Reference numerals throughout all these disclosures are consistent with one another.

Referring now to FIG. 1, there is shown a block diagram of a digitizing system incorporating a controllable vacuum hold down for the cursor. The general aspects of this digitizer's operation are described in "Travelling Wave Digitizer." Such operation has aspects concerning commands sent to the digitizer 1 by the controlling device 2, and has aspects concerning the attributes of local controls on the digitizer itself or on its cursor. This invention is concerned with the properties of commands and local controls either not mentioned or not fully explained in "Travelling Wave Digitizer." These additional commands and controls affect, via an electrically controlled valve 38, the application of vacuum generated by vacuum pump 37 to the cursor 4 through a flexible vacuum hose 101.

When de-energized, the valve 38 connects the vacuum hose 101 to the vacuum pump, which runs continuously. This applies vacuum to the cursor and renders the hold down operative. When energized, the valve 38 releases the vacuum hold down by disconnecting the vacuum hose 101 from the vacuum pump, and opening it to the atmosphere, instead. The stated relationship between de-energizing the valve and application of the vacuum hold down was chosen so that, in the most likely mode of failure of the electrical actuation mechanism within the valve, vacuum would be applied rather than lost. This minimizes the probability of damage to the cursor by its falling off the platen in the event that there is a failure in the valve 38.

This invention is also concerned with those aspects of the cursor's construction that allow it to adhere, by suction, to the digitizing surface when the vacuum is applied. That aspect of the invention is fully described in "Aperture Capacitor Pickup."

Figure 2:
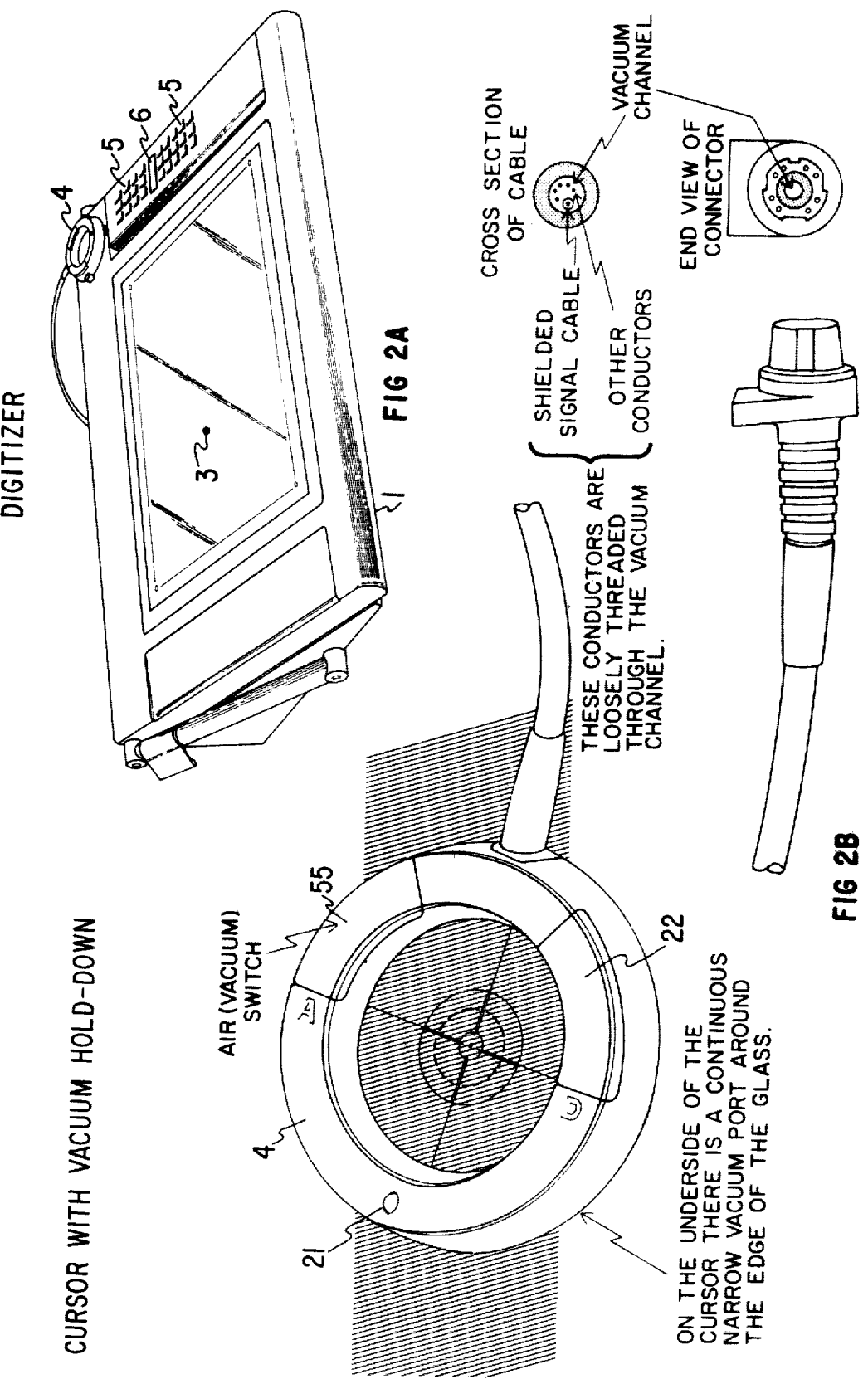
FIG. 2A is a front perspective view of a digitizer and cursor constructed in accordance with FIG. 1 and the preferred embodiment of the invention.
FIG. 2B is a more detailed front perspective view of the cursor of FIG. 2A.
Figure 3:
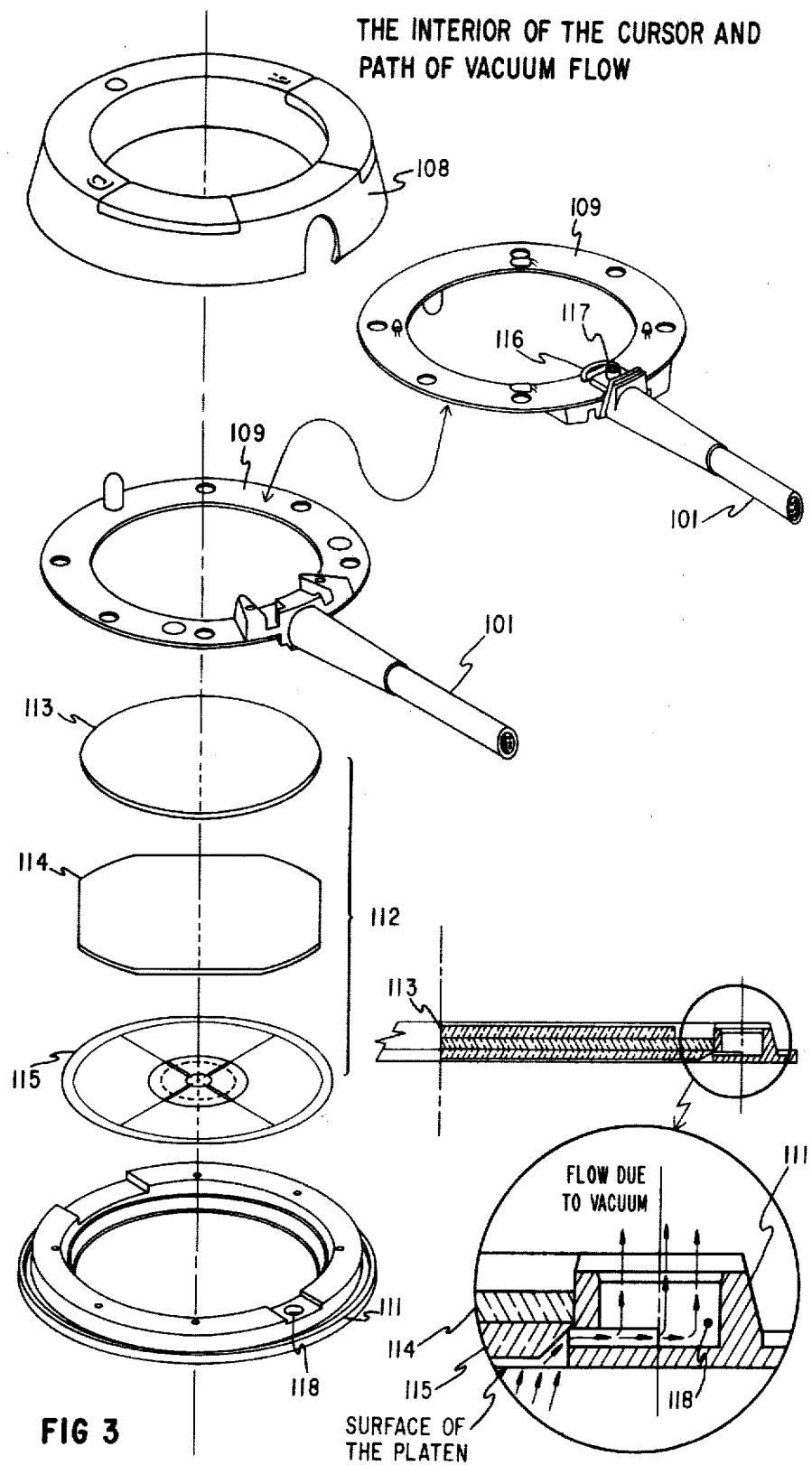
FIG. 3 is an exploded view of the cursor of FIG. 2B, illustrating the vacuum path within the cursor.

A perspective view of the digitizer 1 is shown in FIG. 2A. The top, or front, portion of the digitizer containing the keypad 5 and the platen 3 is hinged at the bottom so that it may be tilted forward until the platen is vertical. Under these conditions it is possible to project data onto the frosted surface of the platen by placing a projector behind the rear portion of the digitizer. The cursor's vacuum hold down can be used to great advantage while digitizing data that is projected onto the platen from the rear.

As shown in FIG. 2B, the cursor 4 includes a push button switch 55 designated "A". This is the "Air," or vacuum switch. It can also be thought of as the "A key;" the digitizer mainframe has a keyboard 5, and the "A" button 55 could as easily be a key on that keyboard, except for its greater convenience when located on the cursor.

Referring again to FIG. 1, there is in addition shown a summary of the control available over the vacuum. To begin with, commands from the controller 2 determine if the "A" key 55 on the cursor 4 will affect the vacuum hold down, or not. The command AV (Apply Vacuum) disables the "A" key and applies the vacuum to the cursor. The command RV (Remove Vacuum) disables the "A" key and removes the vacuum from the cursor. The commands AT and AN establish modes wherein the "A" key controls the application of the vacuum. AT (Activate Toggle) establishes a mode wherein the vacuum is alternately applied and removed, the change occurring each time the "A" key is pressed. AN (Activate Normal) establishes a mode wherein the vacuum is constantly applied except when the "A" key is pressed. This is a useful "Deadman" feature—if the operator accidentally "drops" the cursor while the digitizing surface is tilted vertically (say, to allow rear projection of data to be digitized) the cursor will not fall.

Referring now briefly to FIG. 4, that Figure illustrates the relationship between portions of FIG. 5 (which corresponds to FIG. 16B of "Travelling Wave Digitizer") and FIGS. 6, 7, 8A and 8B. These Figures are each at a different level of abstraction, and FIG. 4 is a useful guide in understanding the information they contain.

Figure 5:
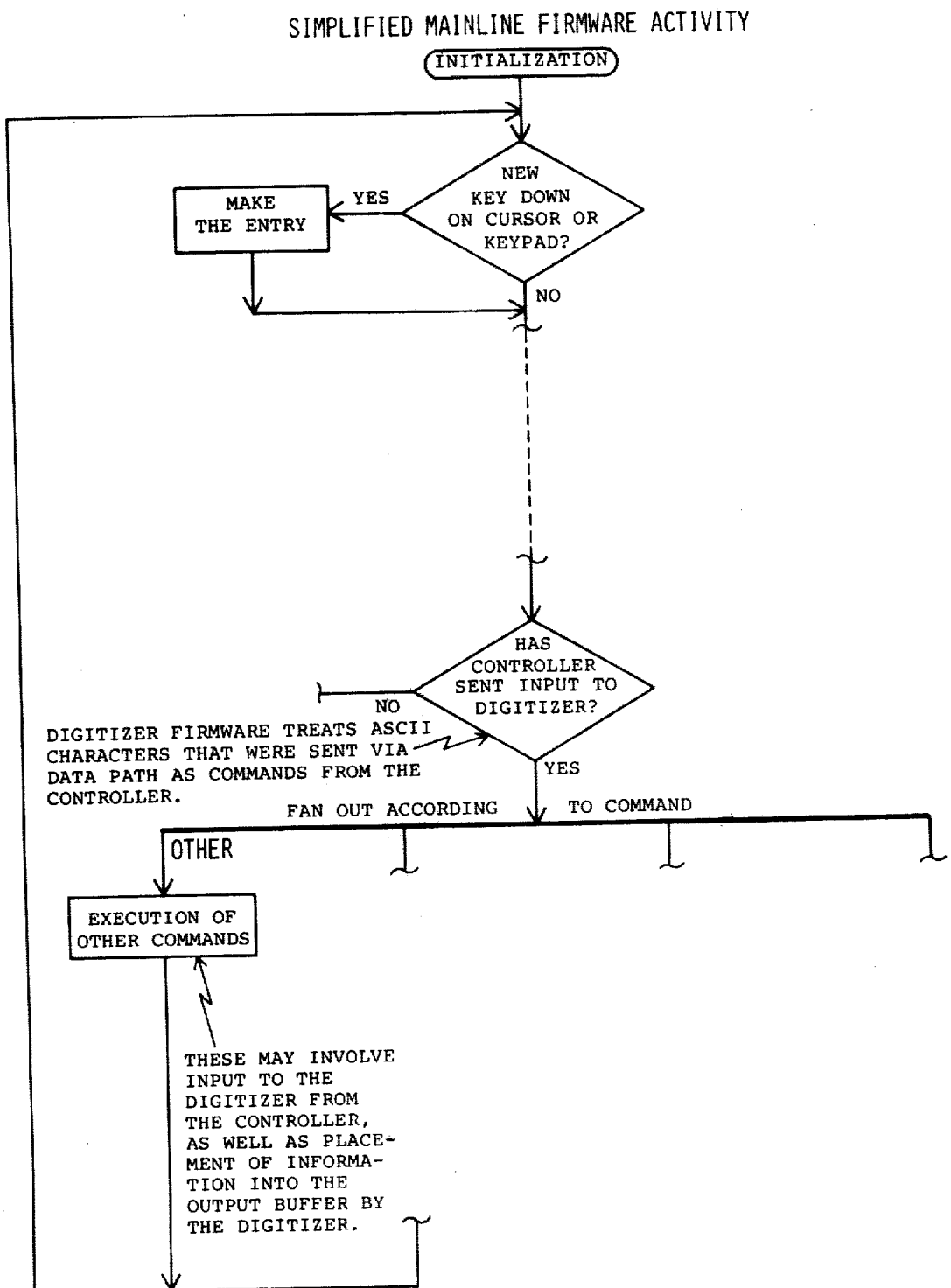
FIG. 5 is a much simplified flowchart of how the digitizer of FIGS. 1 and 2A responds to commands sent to it.
Figure 6:
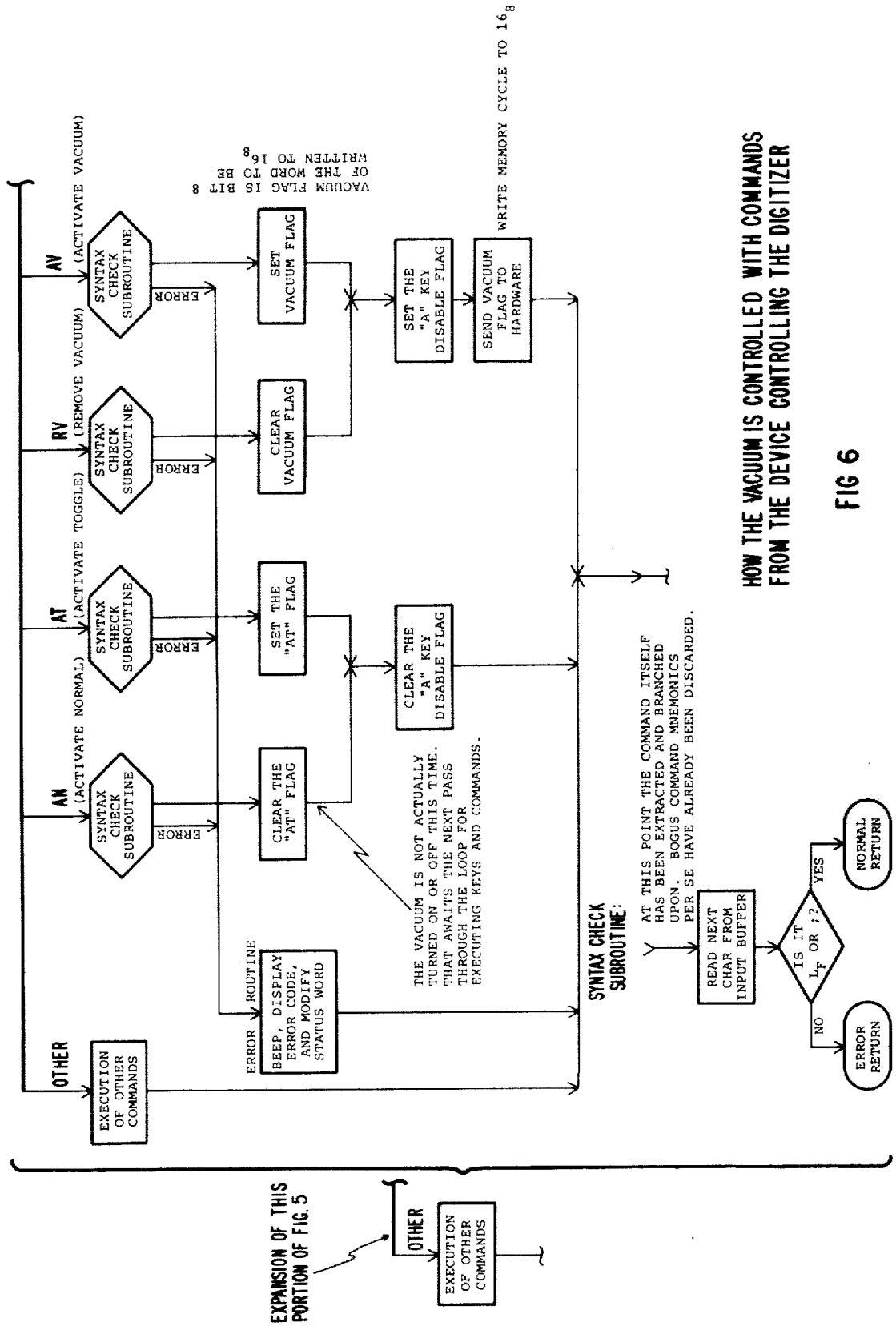
FIG. 6 is an expansion of a portion of FIG. 5, and is a flowchart illustrating generally how the vacuum hold down is controlled by commands issued by the controlling device of FIG. 1.

The manner in which the commands take effect can be understood with reference to FIG. 6. That Figure is an expansion of a certain portion of FIG. 5 (just which portion is also shown as part of FIG. 6). The portion that is expanded has to do with the execution of commands sent to the digitizer by the controller. The expansion shows the activity performed for each of the commands AV, RV, AT, and AN.

For each of these commands, the first thing that is done is to ensure that they are followed by a terminator; i.e., by either a line feed or by a semicolon. Bogus commands (i.e., an illegal combination of characters, such as a mistaken AU for an intended AV) are detected earlier than the activity shown in FIG. 6, so that at this point it is sufficient to examine only what comes after the command mnemonic. The syntax check subroutine has two returns: an error return and a normal return. The error return leads to an error routine that honks the beeper, displays an error code in the display 6 and modifies the status word (accessible by the command OS as discussed in "Travelling Wave Digitizer").

If the syntax check is successful each of the four commands results in unique activity characteristic of that command. These will now be described.

The AV command sets a vacuum flag whose significance is that vacuum should be applied to the cursor. This flag is actually bit 8 of the word to be subsequently written to address $16_8$ by the digitizer's internal microprocessor. (See FIG. 5A and its associated text in "Travelling Wave Digitizer" for an understanding of the significance of writing to address $16_8$. Briefly, bit 8 of the word written to that address controls the electrically operated valve 38 that connects the vacuum to the cursor.) Next, the "A" key disable flag is set, so that later, when the digitizer is checking which keys are down, it will ignore the "A" key even if it is pressed. Finally, the vacuum flag is written to address $16_8$ to cause the valve 38 to assume its proper state.

The RV command is similar to AV. The only difference is that AV clears the vacuum flag.

The AT command sets an "AT" flag upon a successful syntax check. The "AT" flag is used by a different segment of flow charting (see FIG. 8B) that responds to the "A" key on the cursor; the "AT" flag signifies that the "Toggle" mode is active. Next the "A" key disable flag is cleared so that when the digitizer checks the "A" key the state of the key will be recognized. The state of the vacuum is not adjusted at this time; that is accomplished the next time the state of the "A" key is determined.

The AN command is similar to AT. The only difference is that AV clears the "AT" flag. There are only two mutually exclusive modes of "A" key operation possible when the "A" key disable flag is clear, and these are represented by the two different states of the "AT" flag. During the initialization associated with turn-on the digitizer is set to the AN mode.

Figure 7:
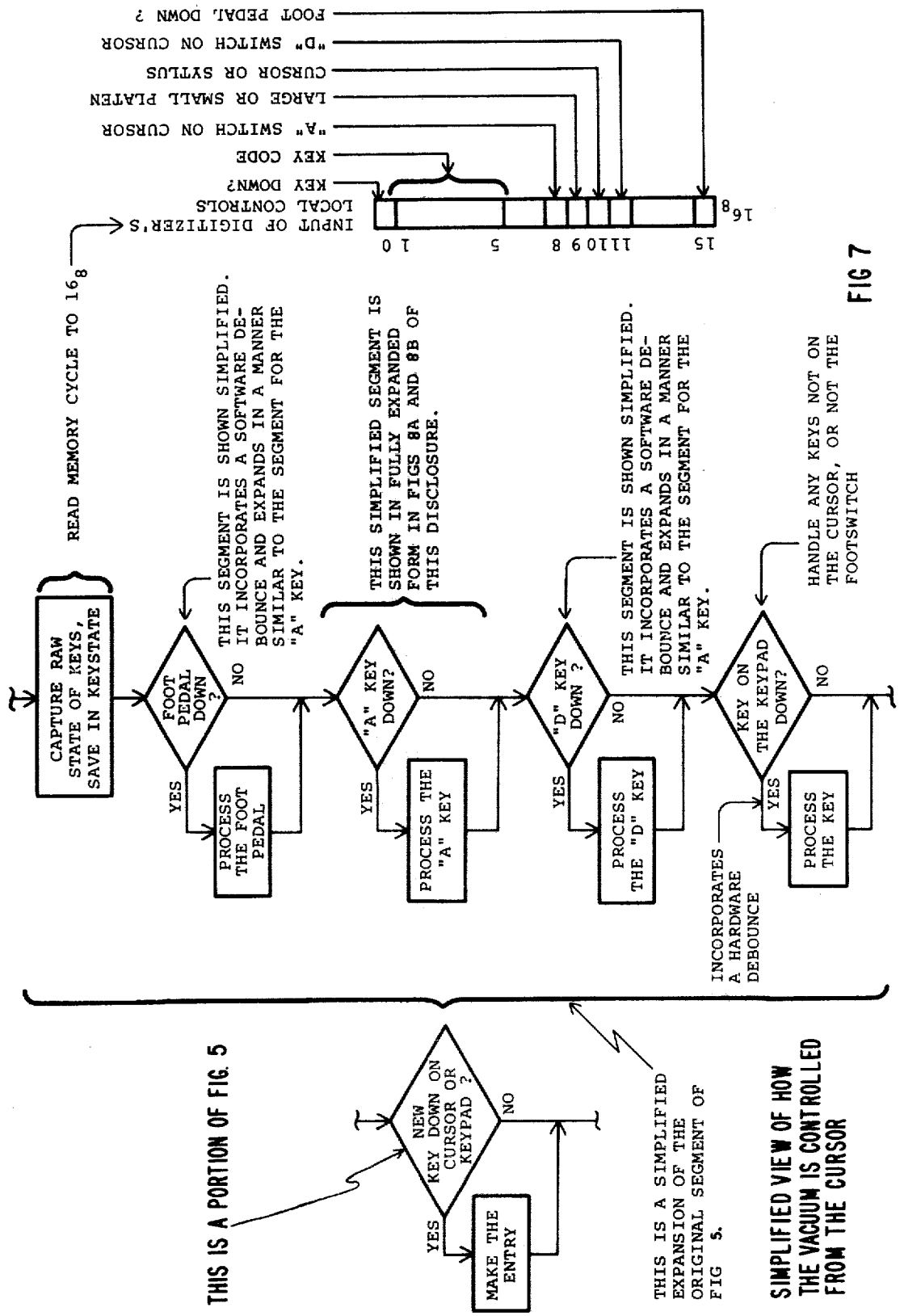
FIG. 7 is an expansion of a portion of FIG. 5, and is itself a simplified flowchart of how the vacuum hold down is controlled from the cursor of FIGS. 1 and 2B.

Referring now to FIG. 7, shown therein is a section of FIG. 5 and a simplified expansion of same. The portion expanded has to do with controlling the vacuum hold down from the cursor itself.

The expansion reveals that the "A" switch on the cursor is checked as part of a series of checks made to determine the status of the local controls on the digitizer. At the beginning of the series of checks the state of each of the controls is captured by a read memory cycle directed to address $16_8$. (Refer to FIG. 5A and its associated text in "Travelling Wave Digitizer" for additional information about this mechanism.) The read memory cycle is not actually directed to "memory"; the current status of each of the digitizer's local controls that is of interest is represented by a bit in the "location" accessed by a read memory cycle directed to address $16_8$. At the start of the series of checks mentioned above the result obtained by the read memory cycle is saved in a word (in memory) called KEYSTATE. The series of checks actually inquire about the values of various bits in KEYSTATE. A portion of FIG. 7 indicates which of the digitizer's local controls are represented by the various bits of KEYSTATE.

Referring now to FIGS. 8A and 8B, these figures comprise an expansion of a portion of FIG. 7, as indicated in FIG. 7.

The first thing that is done is to check the value of the "A" key disable flag. This flag was mentioned in connection with the explanation of FIG. 6, and represents whether or not the device controlling the digitizer has assumed exclusive control of the vacuum hold down. If the flag is set then that is indeed the case, and no further dealings with the "A" key are pursued.

In the event the flag is not set a series of tests are undertaken concerning four other flags. These flags are as follows:

1 "A" Flag is a flag representing the previous (software) debounced state of the "A" key.

2 "A" Flag is a flag representing the transitional values of the "A" key that are observed during the software debounce operation.

3 "A" Flag is a flag representing the current debounced state of the "A" key. This will be the same as the actual "A" key itself, provided that the key has not been recently changed.

"AT" Flag is a flag mentioned in connection with FIG. 6, and which represents the presence or absence of the Toggle Mode.

The #1, #2, and #3 "A" flags are tested in a sequence that produces a software debounce of the "A" key. (This could as easily have been done in hardware, but since a processor was available, it was cheaper and just as effective to do the debounce in software.) The timing of the debounce is achieved by monitoring an entity called the "A" KEY COUNTER. The highest value of this counter is twenty; once every millisecond an interrupt service routine decrements the value of the counter, unless the counter has already reached its minimum value of minus one, in which case the counter is left alone. The counter is not a hardware counter; it is simply a location in memory. A flowchart of the interrupt service routine is depicted in FIG. 9.

The basic principle of the software debounce is as follows: If, after 20 msec have gone by, the previous intermediate state of the key agrees with the present intermediate state, then a valid state has been obtained, and the other flags can be checked to see if this represents a change of valid state. If, on the other hand, there is disagreement, the timer is reset and the 20 msec wait and the agreement test are repeated.

Once a change in the valid state of the "A" key is detected the #1 and #3 "A" Flags are updated, and necessary adjustment to the vacuum is performed. The actual adjustment of the vacuum involves the following. First, the state of the vacuum is, as was explained in connection with FIG. 6, represented by a vacuum flag that is bit 8 of some word in memory. Accordingly, at this time bit 8 of that word is adjusted. The value of that bit is made effective by writing that word to address $16_8$.

FIG. 9 is a flowchart of the interrupt service routine that manages the software debounce counters, among which is the aforementioned "A" KEY COUNTER. The complete routine is depicted, although only the indicated portion is of interest. More information concerning the interrupt system can be found in the text for FIG. 5A of "Travelling Wave Digitizer."

We claim:

1. In a digitizer having a cursor which is moveable across a work surface, a vacuum hold down for the cursor, the vacuum hold down comprising:

a cursor base, having a contact surface that touches the work surface when the cursor is in use, the contact surface having a closed periphery, the cursor base also having a vacuum passage connected at one end to the vacuum source means recited below and opening elsewhere into the region of the cursor base generally bounded by the periphery of the contact surface, the vacuum passage for providing a path along which the atmosphere may be evacuated from the region that is within the periphery of the contact surface and between the cursor base and the work surface when the cursor is on the work surface; and vacuum source means for supplying at least a partial vacuum to the vacuum passage in the cursor base, thereby causing the cursor to adhere by suction to the work surface when the cursor is placed upon the work surface.

2. A vacuum hold down for a digitizing cursor as recited in claim 1, wherein the vacuum source means comprises:

vacuum generation means located external to the cursor, for supplying at least a partial vacuum for the operation of the vacuum hold down; and vacuum conduction means to convey the vacuum, generated by the vacuum generation means, to the cursor.

3. A vacuum hold down for a digitizing cursor as recited in claim 2, wherein the vacuum conduction means comprises a flexible hose.

4. A vacuum hold down for a digitizing cursor as recited in claim 2, further comprising:

vacuum logic means for determining, in response to instructions given to the digitizer, when the vacuum hold down should be in effect and when it should not be in effect.

5. A vacuum hold down for a digitizing cursor as recited in claim 4, wherein the energization of the vacuum generation means is responsive to the vacuum logic means such that the application of the vacuum hold down is controllable by instructions given to the digitizer.

6. A vacuum hold down for a digitizing cursor as recited in claim 4, further comprising a valve, located in series with the vacuum path created by the vacuum generation means, vacuum conduction means, and the vacuum passage in the cursor base, the valve being responsive to the vacuum logic means by opening and closing such that the presence of the vacuum from the vacuum generation means at the contact surface of the cursor base is controllable by instructions given to the digitizer.

7. A vacuum hold down for a digitizing cursor as recited in claim 5 or claim 6, further comprising:

switch means, for giving instructions to the digitizer; and wherein the vacuum logic means is responsive to the instructions given the digitizer via the switch means.

8. A vacuum hold down for a digitizing cursor as recited in claim 7, wherein the switch means comprises a push button switch located on the cursor.

9. In a digitizer responsive to commands from a device external to the digitizer, and having a work surface upon which a moveable cursor is employed, a controllable vacuum hold down for the cursor, the controllable vacuum hold down comprising:

vacuum control means responsive to commands from the device external to the digitizer, for determining, in response to such commands, if the controllable vacuum hold down is to be activated;

vacuum source means, responsive to the vacuum control means, for selectively generating at least a partial vacuum;

vacuum conduction means, for conveying the vacuum provided by the vacuum source means to the cursor;

a vacuum inlet, located on the cursor, for receiving the vacuum conveyed to the cursor by the vacuum conduction means; and a cursor base, having a contact surface that touches the work surface when the cursor is in use, the contact surface having a closed periphery, the cursor base also having a vacuum passage connected at one end of the vacuum source means via the vacuum inlet and opening elsewhere into the region of the cursor base generally bounded by the periphery of the contact surface, the vacuum passage for providing a path along which the atmosphere may be evacuated from the region that is within the periphery of the contact surfaces and between the cursor base and the work surface when the cursor is on the work surface and the vacuum control means responds to a command to activate the vacuum hold down by activating the vacuum source means.

10. A controllable vacuum hold down for a cursor as recited in claim 9, further comprising switch means for providing additional control of the controllable vacuum hold down, and wherein the vacuum control means is additionally responsive to the switch means.

11. A controllable vacuum hold down for a cursor as recited in claim 10, wherein the vacuum control means responds to a first command from the device external to the digitizer by activating the vacuum source means and ignoring the switch means.

12. A controllable vacuum hold down for a cursor as recited in claim 10 wherein the vacuum control means responds to a second command from the device external to the digitizer by de-activating the vacuum source means and ignoring the switch means.

13. A controllable vacuum hold down for a cursor as recited in claim 10, wherein the vacuum control means responds to a third command from the device external to the digitizer by alternating the active/de-active state of the vacuum source means once each time the switch means is activated.

14. A controllable vacuum hold down for a cursor as recited in claim 10, wherein the vacuum control means responds to a fourth command from the device external to the digitizer by activating the vacuum source means when the switch means are in a first state and by de-activating the vacuum source means when the switch means are in a second state.

15. A vacuum hold down for a digitizer cursor comprising:

a cursor, positionable upon a work surface, having a base region for contacting the work surface and having a vacuum passage therethrough with an outlet opening into the base region and also with an inlet;

vacuum generation means located external to the cursor for supplying at least a partial vacuum for the operation of the vacuum hold down;

vacuum conduction means coupled between the vacuum generation means and the inlet of the vacuum passage for conducting the vacuum generated by the vacuum generation means to the cursor; and vacuum logic means for responding to commands applied to the digitizer by selectively activating and selectively deactivating the vacuum hold down.

16. A vacuum hold down for a digitizer cursor as in claim 15 wherein the vacuum generation means is selectively energized and selectively de-energized by the vacuum logic means in response to the commands applied to the digitizer.

17. A vacuum hold down for a digitizer cursor as in claim 15 further comprising a valve located in the vacuum path from the vacuum generation means to the vacuum passage in the cursor for being selectively opened and selectively closed by the vacuum logic means in response to the commands applied to the digitizer.

18. A vacuum hold down for a digitizer cursor as in claim 15 further comprising:
switch means for indicating desired activation and desired deactivation of the vacuum hold down; and
wherein the vacuum logic means is additionally responsive to the switch means.

19. A vacuum hold down for a digitizer cursor as in claim 18 wherein the switch means comprises a push button switch located on the cursor.

20. A controllable cursor vacuum hold down for a digitizer responsive to commands applied by an external apparatus, the controllable cursor vacuum hold down comprising:
a cursor, positionable upon a work surface, having a base region for contacting the work surface and having a vacuum passage therethrough with an outlet opening into the base region and also with an inlet;
vacuum source means supplying at least a partial vacuum for causing atmospheric pressure to press the cursor against the work surface;
flexible vacuum conduction means connected between the inlet of the vacuum passage and the vacuum source means, for conducting the vacuum supplied by the vacuum source means to the cursor at any location upon the work surface; and
vacuum control means responsive to commands applied to the digitizer by the external apparatus, for controlling selective activation and selective deactivation of the controllable cursor vacuum hold down.

21. A controllable cursor vacuum hold down for a digitizer as in claim 20 further comprising switch means for providing additional control of the controllable cursor vacuum hold down and wherein the vacuum control means is additionally responsive to the switch means.

22. A controllable cursor vacuum hold down for a digitizer as in claim 21 wherein the vacuum control means both activates the vacuum source means and ignores the switch means in response to a first command supplied to the digitizer by the external apparatus.

23. A controllable cursor vacuum hold down for a digitizer as in claim 21 wherein the vacuum control means both deactivates the vacuum source means and ignores the switch means in response to a second command applied to the digitizer by the external apparatus.

24. A controllable cursor vacuum hold down for a digitizer as in claim 21 wherein the vacuum control means both activates the vacuum source means when the switch means transitions from a first state to a second state while the vacuum source means is inactive and deactivates the vacuum source means when the switch means transitions from the first state to the second state while the vacuum source means is active, each in response to a third command applied to the digitizer by the external apparatus.

25. A controllable cursor vacuum hold down for a digitizer as in claim 21 wherein the vacuum control means both activates the vacuum source means when the switch means is in a first state and deactivates the vacuum source means when the switch means is in a second state, each in response to a fourth command applied to the digitizer by the external apparatus.

* * * * *